Patented Oct. 5, 1943

2,330,829

UNITED STATES PATENT OFFICE 2,330,829

METHOD OF GEOPHYSICAL EXPLORATION

Hans T. F. Lundberg, Toronto, Ontario, and Norman B. Keevil, Swansea, Ontario, Canada, assignors to Lundberg Exploration S. A., Panama City, Panama, a corporation of Panama No Drawing. Appliction March 27, 1941,
Serial No. 385,486

23 Claims. (Cl. 250—83.6)

This invention relates to a method of geophysical exploration for subterranean deposits such, for instance, as ores, oil and gas, and has for an object to provide procedure whereby the presence, approximate horizontal and vertical location, and approximate areal extent of deposits may be ascertained through calculations based chiefly upon the comparison of the ratios of concentration of radioactive and other emanations and their reaction products in samples collected at different points throughout a horizontal field of the earth's surface and at different depths beneath said points.

Another object is to provide such procedure in which the desired significant indications are obtainable without the necessity of measuring or determining actual concentrations of the emanations and their reaction products in samples, but which is rather based upon determinations and calculations of the substantial ratios of the concentrations of said significant emanations and reaction products at the various points and depths practically regardless of differences in total concentrations.

Another object consists in providing such procedure that involves selection of those emanations that are particularly significant with respect to the presence and location of the deposits sought and the determination and subtraction from said significant emanations, at the various points and depths investigated, of similar or like emanations normally present in the terrain regardless of the proximity of a deposit for which search is being made; whereby the ratios of the remainders of said significant emanations at the various points and depths may more accurately guide the prospector to the presence and horizontal and vertical location of the deposit.

Another object consists in providing such procedure that involves measuring the concentration or strength of the significant emanations by counting alpha and/or beta and gamma rays, and more particularly by such counting of the alpha rays only, and determining their rate of propagation.

Another object consists in providing such procedure that eliminates unsignificant and confusing indications which have heretofore rendered prospecting efforts based wholly or in part upon ascertainment or measurement of radioactive phenomena largely, if not completely, futile.

Another object consists in providing such procedure that includes ratio determinations at the various points and depths of organic and radioactively produced gases.

A further object consists in providing such procedure that embodies certain improvements in steps followed and interpretations of results and indications whereby the above named objects and others inherent in the procedure may effectively be attained.

Reactions and processes are continuously going on in mineral deposits of value which emit substances and produce effects that may be noted at considerable distances from the deposits themselves. These effects may be observed and measured thousands of feet away from a deposit, and, in addition to being directly observable, cause changes in the surrounding and overlying terrain that may be observed and recorded.

There have been previous attempts to measure and record radioactivity at the surface but, as radioactive elements exist in all rocks and minerals, each part of the rock and soil has its own radioactivity effects so that, in order to determine the presence and location of distant deposits by means of diffusing radioactive emanations, it is necessary also to determine the quantities of such emanations arising from rocks and soil in the immediate vicinity of the point of observation apart from the effects generated by the comparatively distant deposits in order that the last named effects may be calculated. This is emphasized by the fact that, although previous attempts at prospecting based on radioactive effects have included more or less complete chemical analyses and ionization measurements of rock and soil samples collected at various points over an area, the results have not been conclusive largely because such previous attempts do not provide for or enable an allowance for effects or properties local to the points of observation as distinct from like or similar effects coming from more distant deposits.

Previous attempts to locate sub-surface mineral deposits by means of traces of emanations diffusing upwards from them, have relied upon chemical analyses in which the results are expressed in conventional concentration units. As a result, the data obtained have not been easily interpretable, variations being frequently obtained for adjacent samples of different soil types or of different porosities, and peculiar concentration patterns being found which have not altogether fitted in logically with other geophysical knowledge. Some of these mysterious effects have probably been due to incomplete treatment of data as well as to experimental shortcomings and the natural limitations incumbent upon geological diffusion processes.

In the treatment of experimental measurements, it is important that the final results be properly expressed, and that the computations be carried sufficiently far to give the maximum significance, or at least to give quantities which are really useful in making geophysical interpretations. In this regard absolute concentrations are of limited usefulness because they are subject to large errors due to such factors, as, differences in soil-type, differences in porosity, differences in adsorptive capacity, differences in water content, differences in samples collected at different depths and so on. A more fundamental procedure is to determine (or calculate) from the experimental measurements, ratios of abundances of one component to another. This eliminates some of the errors, listed above, which occur when absolute concentrations are employed, and it minimizes others to a sufficient extent to yield results which can be used with confidence in predicting sub-surface features.

In addition to detecting the mere presence of diffusible substances, the use of adequately corrected data at different depths gives information helpful in predicting the vertical as well as the horizontal location of the mineral deposit. Variations in the ratios can be interpreted in the light of the known rate of decay of radioactive elements with time, of the effect of the size of the atom or molecule, and of the effect of interatomic forces between the diffusing substance and the diffusing medium. Thus, the helium-radon ratio increases towards the surface due to the factors of small atomic size and weak inter-molecular forces associated with helium, and to the decay of radon. The helium-hydrocarbon ratio increases similarly, due to the smaller size of the helium atom, and its freedom from delaying interatomic forces. In the case of ratios involving different hydrocarbons, ratios of lighter to heavier molecules will increase towards the surface, but these ratios are only of limited value because of complications which result from surface reactions of adsorption, polymerization and so on.

In the entire course of diffusion of organic molecules from accumulation of petroleum or gas, reactions and changes occur, due to the change in the physical and chemical environment from one rock to another. In one environment, the molecule may react with certain constituents to form new gaseous products, to be absorbed or to be precipitated; in another the molecule may be split up into smaller molecules; in another polymerization may occur; catalysts may produce changes in certain beds, and so on. These remarks serve to emphasize the complications that enter in the process of diffusion from petroleum deposits and to illustrate the errors that would be involved in considering absolute concentration as has been done by geochemical methods in the past. By using our ratio method these errors can be eliminated or reduced, since the results are more amenable to correction, and evaluation of these disturbing influences can be more readily made.

Ratios involving hydrogen are useful but interpretation of the results involves a careful consideration of available knowledge of rocks overlying the mineral deposits. However, in general, the hydrogen-hydrocarbon ratio increases towards the surface, as does the hydrogen-radon ratio. The hydrogen helium ratio may decrease in porous rocks, especially where the diffusion of hydrogen is delayed by interatomic forces. In saturated compacted rocks the reverse change may take place in the hydrogen-helium ratio. The changes with depth are thus of value in estimating the vertical position of mineral deposits, but another important value of ratios is in interpreting horizontal variations in diffusible emanations. In these cases it is frequently sufficient to obtain merely a representative or comparable portion of the gases contained or adsorbed by the soil or rock, and to determine the relative abundances of the constituents. Errors are obviated by not taking all of the gas included in the soil and by omitting study of the effects of impurities.

Our invention takes note and makes use of the above named phenomena and enables the prospector to obtain reliable determinations of the effects arising from distant deposits in spite of the existence of strong effects of like or similar character arising from the terrain local to the point of observation. It involves the detection of the local emanations coming from distant deposits, and it proposes to determine the ratios of radioactive emanations, more particularly the rays from radon, between various points and depths in the ground, as well as the ratios of radio-actively produced gases, especially helium and hydrogen, between various points and depths in the ground, and to make use of the variations in these significant ratios at the different points and depths for calculations as to the presence, horizontal and vertical location, and extent of valuable deposits or structures for which search is being made. The ratio thus employed may be further defined as the ratio of the strength of said emanations at a given point of the terrain to the strength of such emanations at other points as well as the ratio of the amount of said gases at a given point of the terrain to the amount of such gases at other points; the determination of such ratios being carried out with respect to all the points, both horizontal and vertical, i. e. surface and depth, included in the investigation; and the determinations being usable not only as showing the changes in ratios of said emanations with respect to each other between the different points, and/or as showing the changes in ratios of said gases with respect to each other between the different points; but such determinations being also usable as showing the changes in ratios of both said emanations and said gases with respect to themselves and with respect to each other at the different points thus, in effect, comparing ratios of ratios of such significant indications.

It is believed that an average rock sample contains every chemical element, although some elements may not be detectable by known means which require for detection the presence of many million millions of atoms. This serves to emphasize the importance of the use of radioactivity in our procedure which enables measurement of the effects of individual atoms of chemical elements because the energy associated with radioactive disintegrations is many million millions of times more potent than the energy assocated with other atomic processes.

In ordinary rocks the spontaneous explosion of radioactive elements goes on continuously, accompanied by energetic alpha, beta and gamma rays forming intermediate radioactive elements and finally producing helium and lead. This regular bombardment of radioactive particles produces effects that are useful in determining the age of rocks and also in distinguishing between certain rocks and minerals, thereby lending itself to our novel procedure which envisages and is in part based upon the fact that differences in distribution of radioactivity occur between ore bodies, oil deposits and gas accumulations on the one hand, and ordinary country rocks on the other hand.

Alpha rays (helium ions), beta rays (electrons), and gamma rays (X-rays) emitted by radioactive elements in rocks are difficult if not impossible of detection at any great distance. Even the most penetrating gamma rays are stopped by a few feet of soil or rock. However, during the course of radioactive disintegration which progresses at a uniform rate irrespective of environment, several gaseous substances are produced, each one at a constant rate. Three of these are radioactive isotopes: thoron, actinon, and radon, the first two of which decay or vanish within a few seconds while the third will remain in measurable concentrations for fairly long periods, about two percent of the equilibrium value remaining after three weeks. Diffusion of the radon from its generative source may take place to a considerable distance during the time in which it remains in detectable concentrations. Helium, one of two stable end products, is produced in even greater quantities than radon by radioactive disintegration and escapes from petroliferous beds and deposits of radioactive ore. Due to its rapid diffusion through porous rocks and its appreciable concentration, helium can be an important factor in geophysical exploration. Thus it will be clear that the rays or radioactive effect of radon and the presence of the diffusible gaseous element helium are both of value in this procedure as indicators of a radioactive deposit at depth. Of course, the rate and extent of diffusion of these substances is affected by differences in ground characteristics such, for instance, as porosity of rocks or soil, fractures, faults and temperature gradients, but research work of both theoretical and experimental nature has demonstrated that diffusion frequently takes place to such an extent that the emanations may be detected hundreds of feet from their generative source.

The amounts of diffused radon in soil or rock can be determined by correcting the total radon measured for that contributed by surface material. The difference thus obtained is the quantity that is significant in showing the presence of extraneous radioactive material, and so of indicating a source of relatively more radioactive deposits at depth which may be of economic importance. The method of making determinations of diffused radon and correcting for emanations formed in situ are disclosed herein. If the radioactivities of the soil at the surface were fairly uniform at the depths sampled and over the area surveyed, then the discovery of large anomalies, either in ratios or in concentrations would signify an extraneous source of radon. However, the presence of anomalies in an area containing soils of marked difference in total radioactivity would be meaningless if based upon a single measurement of emanation as done previously. When one or more additional measurements are made so that local contributions can be taken into account, the remaining anomalies are of some significance. Further evidence for the presence of such deposits at depth can be derived from the vertical gradient of concentration; from the magnitude of the ratios, or from changes in the ratio as to amounts or concentrations of emanation (corrected for local contributions) between samples taken at different depths in the same hole or bore.

Another means of detecting the presence of radioactive material at depth is offered by the deposition of radioactive salts from upward migrating solutions and radioactive products which follow radon in the uranium series of radioactive elements. These latter products are deposited in the path of diffusing radon by that fraction which has already disintegrated in the normal way, and are frequently referred to as the "active deposit" from radon. This deposit may be of greater significance than radon in those cases where the experimental or sampling techniques are limited to the extent that the radon cannot be detected or else cannot be accurately determined. If the quantities of radon now diffusing from below are too small to be measured, some of the end products, having much longer half-lives, may have been built up to measurable concentrations. (Radium D for example, possesses a half-life of 25 years.)

The decay of radioactive elements follows the exponential law. In a sample of such substance, then, the number of atoms decaying is most rapid at first, though the number disintegrating and the number of atoms left gradually decreases but never reaches zero. Thus, one cannot speak of the "life" of a radioactive element but only of the probability of an atom decaying, a quantity that is fixed and which has been experimentally determined. It has been customary to compare the activity of different radioactive elements by comparing the time in which the probability of decay is one chance in two. With a sufficiently large number of samples, such as are present in any sample with which we are accustomed to deal, statistical fluctuations are smoothed out and this time, the "half-life," is the actual time required for any sample to decay to one-half of its original observed concentration. In the case of radon diffusing through surface material, a certain time will be required before an atom can reach the surface; this may be just beyond the time necessary to allow measurable concentrations to diffuse upwards. However, the end-products resulting from this decay process, having longer half-lives, may in such cases accumulate in time in sufficient quantities to be useful in detecting the presence of sub-surface deposits or structures. Likewise, if the flow of radon ceases, for instance by a blocking of small fissures, so that the concentrations reaching the surface are below the detectable limit, the active deposit may have been built in sufficient quantities during the period in which appreciable diffusion did take place to still remain evident over the normal activity of the surface soil or rock for a limited period of time.

In some cases, solutions percolating upwards may carry radioactive and other salts from subterraneous mineral deposits which are left or concentrated by evaporation or precipitation near the surface. In both of the above cases, an added radioactivity or mineralization effect will be superimposed upon the normal background of the surface rock or soil, and so anomalies showing high activity or high mineralization are of value in interpreting sub-surface conditions. Where the normal radioactive background is found to be uniform, this may be applied as a correction in oder to bring out the residual activity due to migration of radioactive substances. Such a concentration may, for instance, be quite pronounced over a fault and may indicate the presence of an oil accumulation or an ore deposit when measurements of the radioactive effects are made at various points on the ground in question and/or when such observations are made at two or more different depths at the said points.

With particular reference to geophysical prospecting for petroleum, we have found that certain gases produced by radioactive effects are especially important. The large amount of energy accompanying radioactive disintegration causes disruption of organic molecules in petroleum and the forming of hydrogen while, as already indicated, helium is also formed at a constant rate. As the helium atom is smaller and more inert than radon, it diffuses faster, in fact faster than any other substance. Before helium concentrations can be of significance, however, corrections should be applied for the amount contributed by leakage from imperfect crystals in surface soil and rock. The same additional measurement hereinafter mentioned as necessary for the radon correction can be used for this purpose. Hydrogen also diffuses rapidly but this action is hindered by interatomic forces and is thus somewhat affected by the medium in which diffusion takes place. These two gases, helium and hydrogen, are particularly useful as indicators of petroleum deposits at comparatively great depths, e. g. below the detectable range of diffusing radium emanation but, as noted in an earlier part of this specification, variations in ratios of concentrations of these radioactively produced gases in the different samples are of greater significance than fluctuations in the actual percentage of any one gas among the several samples.

While it has been the practice to express analytical results for soil gases in proportion by weight, and to work with similar types of material presumably to obtain comparable data, we have found it generally preferable to express the results in proportion to free space. This gives more interpretable data, and also lessens the chance of error due to differences in porosity and other characteristics between samples.

It may be added that, particularly in the case of prospecting for oil, we have found that ratios of diffusible organic constituents in the different samples, either among these organic constituents themselves or between the said constituents and radioactively produced gases associated with oil, are helpful in carrying out a comprehensive application of our prospecting procedure, and yield essentially more significant and more easily interpretable data than obtained by purely quantitative geochemical methods.

The foregoing remarks have been set forth in part by way of explanation of our novel procedure constituting the subject matter of this invention and in part by way of presenting a background leading to a better understanding of the invention which we believe constitutes an important practical advance in this field.

By way of summarizing, but without intending to be precisely inclusive or exclusive, it may be noted that this new method of geophysical prospecting involves determination of the vertical and horizontal distribution at readily accessible depths, as well as in deep bore holes, of ratios of concentrations of diffusible gaseous substances emanating from the deposits for which search is being made. More particularly, we determine the ratios involving radon, helium, hydrogen, inorganic and organic "ion-fragments," and/or any combination of radioactively produced emanations, and interpret the significance of the ratios of these gases that are found in soil and rock at various points near the surface of the field being investigated and at various depths. In order to reduce or eliminate errors likely to arise from variations in the chemical and physical characteristics of rock and soil, such as variations in composition, texture, porosity, water content, adsorptive capacity, etc., our procedure characteristically employs ratios of the significant substances rather than their absolute concentrations which are subject to wide fluctuations. Finally, the accuracy of our procedure is further enhanced by obviating or minimizing errors due to the presence of such gases emanating from the soil or rocks overlying the sought deposits, through the making of separate measurements and/or systematic calculations to correct for the said emanations that are due to the constituents of the surface soils and rocks themselves rather than to the hidden deposits. This enables corrections to be made with respect to the total concentrations of said emanations at the points and depths investigated and permits the prospector to discern the differences in the ratios of the emanations at the said points and depths which are significant as indicators of the presence and horizontal and vertical location of the deposits for which search is being made.

Before proceeding to the outlining of an illustrative practical application of our method, it is deemed advisable to emphasize the necessity for segregating data attributable to the significant effects or phenomena from the total or inclusive data in order that the comparative ratio results may truly be indicative of the answers sought. For instance, methane, carbon dioxide, nitrogen, and oxygen are products of chemical and bacterial action in the soil and are usually present in such appreciable and variable concentrations that they are practically useless as indicators of subsurface deposits. Likewise, hydrogen and carbon monoxide may be generated in economically barren formations near the surface, so that, before interpreting the results of our method, corrections are made where necessary for such gases of origin foreign to valuable deposits. In this connection it may be noted that, although as much as approximately ninety-five per cent. of methane may be found in such surface gases as marsh gas, the next heavier hydro-carbon, ethane, is present in the said gas to only a very small fraction of one per cent., and the still heavier hydro-carbons are not detectable. Ethane, and to a greater extent, butane, propane, and probably hexane, together with their reaction products or ion-fragments, are useful as indicators of oil deposits. Again, some radon present in the gas phase or gas-solid interphase is formed from the radium that is universally present in surface rocks, and correction must be made for this radon before the amount or concentration of significant diffusible radon can be ascertained. This correction can be made with respect to the total radon observed, by knowledge of the equilibrium radon content of the surface rocks and their emanating power. Thus, the build-up of radon from solid samples can be determined directly, or the total radium content measured in the usual way, and the emanating power determined separately. Technique for accomplishing this is known to those skilled in this art. (See the article by Evans, Goodman, Keevil, Lane and Urry, Phys. Rev. 931–946, 1939.) However, as the methods for radon determination set forth in these articles are somewhat time consuming, we prefer to determine the total alpha-ray, and in some cases other ray-activities of the soil, by direct measurement, and then find the total or relative radon content by computations based upon the technical knowledge as to the distribution of radio-activities in rocks. (See the following articles: Keevil, Am. J. Sc., 237, 195–214, 1939; Keevil, Econ. Geol. 33, 685–696, 1938; Nier A., J. A. C. S. July 1938.) This result may be combined with the emanating power, which latter can be determined for each type of soil or rock or, if preferred, for each sample taken (see article by Satterley in Cambridge Phil. Soc. Proc. 16, No. 4, pp. 336–355, 1911; ibid. No. 6, pp. 514–533, 1912); or by using an average determined background value for the area under consideration.

Helium, to the importance of which in our procedure reference has previously been made, is not affected chemically and is normally produced by radioactive processes in mineral deposits. While small quantities of helium thus generated in many crystalline minerals do not escape, in some crystalline minerals and in altered or non-crystalline rocks, leakage of helium may occur to such an extent that a correction is necessary with respect to the total concentration of helium observed. This can be calculated from the radio-activity data obtained in the light of a knowledge of the age and emanating power of the rocks (see the articles by Keevil in Trans. Roy. Soc. Canada, 32, IV, 123–150, 1938; Am. Jour. Sc., 36, 406–416, 1938; Proc. Am. Acad. of Arts and Sc., 73, 11, 311–359, 1940), and the same measurements made for the radon correction may be used in one method.

Turning now to an illustrative example of a practical application of our method or procedure, a hole or bore is drilled in the ground being investigated to a depth below the zone of fluctuation, which latter may be defined as that layer or thickness extending from the surface of the ground downwardly which is appreciably affected, as far as our data are concerned, by atmospheric agencies and changes in surface conditions such as temperature, pressure, wind and water. From this hole or bore a sample is taken, preferably below the uppermost isotherm and usually below the water table, which sample may be in the form of a solid core of rock, solid rock cuttings, soil, liquid and/or gas, depending upon prevailing conditions and experimental and interpretational factors involved in the particular investigation in hand. Similar samples are then taken at greater depths.

For instance, in the case of gas-rich soils or rocks, a sampling tube may be inserted with or after the drilling device, the usual precautions taken to avoid contamination by air, and a gas sample may be admitted directly to an evacuated collection flask or chamber through vacuum and pressure tight tubing and vacuum stopcocks.

Again, in cases where the ground material is saturated or nearly saturated with water, a combined water and gas sample may be taken. This can be accomplished by lowering a container in the hole or bore, making use of any known or approved device for insulating a portion of the hole, and then taking a sample of water and gas from said portion of the hole by means of apparatus such as is commonly employed in cementing certain portions of such holes or bores. Suitable mechanisms and procedures for obtaining the samples are known to those skilled in the art, but it may be said, by way of illustration, that a pipe may be inserted in the hole leaving a space of about one inch between the outside of the pipe and the wall of the hole. Two rings are fixed to the outside of the pipe by vacuum tight seal, and to these rings are fastened an end of two circular pieces of flexible material, such as rubber, which normally have an outside diameter slightly less than that of the hole. The other ends of these flexible pieces are attached to rings fitted to slide along the pipe under pressure so that the slidable rings can be moved toward the fixed rings and thus expand the rubber pieces outwardly so as effectively to seal the space between the pipe and the wall of the hole. The space between the said rubber pieces may then be pumped out, flushed and/or evacuated and a sample of gas and water, or gas alone, taken through tubes and admitted to a sampling flask that has been lowered in the hole or attached to the inside of the pipe. This sampling flask may be connected to a vacuum pump and sealed by means of a valve.

In other cases, or in conjunction with the gas or liquid samplings just described, a solid core or cuttings may be either confined so as to avoid contamination or be worked to eliminate any important contamination, after which the sample is transferred to a flask or chamber that can be flushed with a condensible or other suitable gas, such as carbon dioxide or nitrogen, evacuated, and sealed by means of a valve, joint or stopcock; again, compact solid cores may be used without special sampling procedures. When the escape of gaseous material from these cores is slow and occurs at comparable rates in different cores, it is only necessary to confine the sample so as to avoid errors from external contamination. While satisfactory results have been obtained in some cases after such cores have remained for several days, it has been found preferable to examine the samples in as short a time as possible after coring, and to allow similar times for each sample in order to obtain comparable data. Indeed, in view of measurements which we have made on the de-emanation of samples, it is recommended that the samples be confined directly in the field and that no loss or introduction of material be allowed before experimentation.

If a gas sample is taken from the hole or bore, it is dried if necessary and then the radon is determined by the build-up of ionization or by the rate of the alpha-ray, or other radioactive ray, emission in a suitable ionization chamber. (See the articles by Evans, Goodman, Keevil, Lane and Urry, Phys. Rev., 55, 931–946, 1939; Poole, Sci. Proc. Roy. Dublin Soc. 21, 595–614, 1938.) The gas sample, or a reserved portion thereof, is transferred to a collection vessel or to a purification system and the gases, such as oxygen, nitrogen, and carbon dioxide, as well as the water, removed therefrom by conventional physical-chemical methods. (See Denis, Gas Analysis, and A. Farkas and H. W. Melville, Experimental Methods in Gas Reactions, MacMillan Publishing Co. London 1939.) After these gases which are not useful in the determination in hand have been removed, a portion of the residual gas is sealed off in a sampling tube in the usual way, or transferred to any known or approved form of apparatus for measurement. In this step the pressure can be adjusted to the desired amount by means of pistons or pumps such, for instance, as the Toeppler pump. One or more gas samples may be sealed off depending upon which gases or portions it is desired to study later.

Thereafter the gas is introduced, through a capillary leak or by adjustment of the pressure in any convenient way, to a system or apparatus in which the gas can be ionized in any known or approved manner, such as by bombardment with high speed electrons. (See the articles by Nier, Phys. Rev. R–SI, 1935–1940.) The paths of positive ions thus formed are then controlled by electrical and magnetic fields so that they can be resolved and distinguished according to any known or approved method (see the articles by Tate and Nier, Phys. Rev. R–SI, 1935–1940), and the relative abundances and ratios of helium ions, hydrogen ions, and organic ion-fragments, etc., thereby determined.

In the case of a water sample, the gases can be evolved from the liquid in the usual way, as by heating or reaction, and the gas samples transferred, measured and tested as above described. In the case of solid samples, loosely held gases may be removed from the vacuum-tight container by means of pumps. Gases held by stronger physical forces can be removed by grinding under vacuum, or by pre-cooling, and those held by stronger intermolecular forces can be removed by heating or by acid treatment or, if desired, in the case of organic substances, by grinding under suitable solvents such, for example, as ether, and then separating the solutes by any conventional method, such as fractional distillation in an air-tight system. Gases thus obtained may then be transferred, measured and tested as explained above.

The rock at the point from which the sample is taken is examined for radioactivity in any known or approved way (see Keevil, Trans. Roy. Soc. 32, 4, 123–150, 1938) and the results used to apply the necessary correction as previously explained so as not to include emanations arising from the natural radioactivity of the rock owing to its own constituents, and thus distinguish effects derived from underlying deposits of ore, oil, or gas.

From the foregoing description it will be seen that two radioactivity measurements or determinations are made on each sample of solid material, one on the gases present in the sample material, and one on the solid material itself. An electro-cation analysis of one or more gas samples, which preferably have been subjected to initial concentration, is also made to determine the helium hydrogen ratio and, finally, the ratios involving organic ion-fragments are determined. For testing the organic material, a fractional purification method is used, and in concentrating helium and hydrogen a low temperature concentration method is followed. One procedure which can be used is, briefly, as follows: The gas sample or any suitable portion thereof collected as such or prepared by suitable treatment of solid or liquid samples, is introduced into an ionization chamber by means of de-emanated gas and the rate of emission of alpha or other radioactive rays is determined. From half, or any suitable known portion, of this gas or from a portion reserved from the original gas sample, gases other than helium and hydrogen are then condensed in low temperature adsorption traps, for example, using traps filled with specially treated charcoal for short periods, and the ratio of helium to hydrogen in the residual gas sample determined by measuring or calculating the residual pressure of the said gases present in the prepared sample in the usual way and subjecting them to ion analysis. On another portion of the collected or prepared gas sample, the condensible gases are freed of non-condensibles such as nitrogen, oxygen, hydrogen, helium and methane, by suitable traps, such as Pyrex traps cooled for example with dry-ice-alcohol mixture. The condensed fraction is then evaporated and freed of water and carbon dioxide and other impurities by means of traps and absorbers, such as ascarite and phosphorus pentoxide. The abundance ratios of desirable ions, such as organic ion fragments, are then determined in the sample by ion analysis as described above. If a small portion is used for these measurements, the fraction of the original sample used is obtained from the proper pressure measurements, using apparatus calibrated for volumes and pressures in the usual way. The organic material in the sample may be removed by grinding under a solvent, separating fractionally, passing through a purification train, pumping by a suitable device, and diffusing through a capillary leak to a spectrometer. On a fraction of the de-emanated sample or of the original sample (preferably dried) the rate of the alpha activity is measured in order to obtain a quantity necessary for the evaluation of the correction factors.

The ionization chamber test of both gaseous and solid samples may involve not only the counting of the alpha rays but also, as previously intimated, the counting of beta and gamma rays, which testing and counting may be carried out according to known techniques as previously noted, or by counting the gamma, beta and alpha rays in a single chamber into which the gases have been introduced under uniform conditions and at suitable pressures and with which essentially the same general type of tube and circuit as employed in modern gamma-ray counters may be used. We have, however, found that the application of the step of alpha-ray counting is of particular availability and importance in our new method of prospecting. Other useful ratios may be obtained by making cation analyses of inorganic material in solid samples. In this way useful and important information as to the vertical and lateral changes are obtained regarding secondary mineralization. The ratio method provides a means of indicating those variations in surface mineralization which are associated with upward diffusing gases and solutions.

It will be understood that the sampling, testing and measuring hereinabove described with respect to samples taken at given points and depths are repeated throughout the area being investigated, and ordinarily at two or more depths with respect to each point, although for some purposes one depth alone may be satisfactory. From the observations made the results are calculated in terms of ratios and, in the case of ion-fragment analyses, the relative abundances may be determined from the ratio of voltage readings, or directly by null or bridge methods. The changes of these ratios from point to point are found together with the changes at different depths, and the results are plotted either as ratios or as gradients rather than as concentrations. Any closure or area within the field being investigated which shows an abrupt change in ratio or ratios of the significant elements, particularly those involving radon, helium, hydrogen, and/or organic ion-fragments, will, when considered in relation to other geophysical data and conditions that are regularly taken into account by prospectors, serve as a guide to reliable conclusions as to the presence and horizontal and vertical location of the sought for deposit or deposits.

In general, it may be stated that the ratios of radon to helium and radon to hydro-carbon are particularly useful as indicating proximity to a shallow deposit, while the ratios involving helium to hydro-carbon ions, hydrogen to hydrocarbon, helium to hydrogen, are particularly useful as indicating the existence of a deposit or deposits at greater depths or distances. Wide fluctuations in corrected ratios of helium to hydrocarbon, hydrogen to hydrocarbon ions, helium to hydrogen, radon to helium, and radon to hydrogen, may indicate an interfering bed, so that ratios between hydrocarbons of two different types are useful in conjunction with the previously named ratios in interpreting the significance of the data with particular relation to deeper deposits. Changes of the ratios with depth are particularly significant in giving indications as to the vertical position of the sought for deposit.

In order to avoid too great prolixity in this specification, we have made several references to published articles setting forth known methods and techniques suitable for carrying out certain of our steps or parts thereof, and we may add that those skilled in this art are equipped and competent to perform the observations, tests, and calculations involved in our new procedure so as to put the same to practical use in the light of the foregoing description. It seems proper again to point out or emphasize that we do not rely entirely upon absolute determinations of radioactive effects at the points and depths investigated, but rather upon determinations of the ratios of radioactive effects at the various points and depths with particular note of variations in such ratios. Furthermore, we are careful to eliminate, largely or wholly, from our determinations radioactive effects of those substances which are not significant with respect to the presence or approximate location of a deposit for which search is being made. Spurious electrical effects are eliminated or discarded and only the ionization due to the rays being measured is used. Corrections are made for the contribution of such rays from the natural radioactivity of the parts exposed at the interior of the ionization or counting instrument, thereby serving to correct the indications obtained by eliminating what might be referred to as spurious and background effects. Finally, we interpret our determinations in the light of existing geological knowledge in the field under investigation, the natural or normal effects and associations of which, within the knowledge of skilled geologists, would tend to guide the prospector toward conclusions with respect to the likelihood of the presence and approximate location of a valuable deposit.

We desire it to be understood that various changes may be made in the order of the steps followed; in the performance of the steps themselves; and in the technique, apparatus, and materials employed without departing from the spirit and scope of our invention, and hence we do not intend to be limited to details herein set forth except as the same may be recited in the claims.

What we claim is:

1. A method of geophysical exploration including, taking samples from the earth at different points in a field being investigated, measuring the radioactivity of emanations held by said samples to determine the ratios between the concentrations thereof at the different points from which samples were taken, and calculating by comparison of said ratios the presence and location of a sought for deposit.

2. A method of geophysical exploration including, taking samples from the earth at different points in a field being investigated, measuring the radioactivity of emanations held by said samples, distinguishing emanations generated by a sought for deposit from emanations due to the normal radioactivity of the samples, determining the ratios between the strengths of the significant emanations at the different points from which samples were taken, and calculating by comparison of said ratios the presence and location of a sought for deposit.

3. A method of geophysical exploration including, taking samples from the earth at different points in a field being investigated, measuring the radioactivity of the radon and the relative proportions of helium held by said samples to determine the ratios between the concentrations thereof at the different points from which samples were taken, and calculating by comparison of said ratios the presence and location of a sought for deposit.

4. A method of geophysical exploration including, taking samples from the earth at different points in a field being investigated, measuring the relative proportions of helium present in the samples, correcting for helium formed by surface materials, by making an additional measurement on the sample, determining the ratios between said correct helium proportions at the different points from which samples were taken with the aid of premised values of the period in which the helium accumulated and of the diffusion factor, and calculating by comparison of said ratios the presence and location of sub-surface deposits.

5. A method of geophysical exploration including, taking samples from the earth at different points in a field being investigated, measuring the radioactivity of contained emanations by means of ray counting, correcting the total measured by that formed from surface materials by separate measurements of said materials by means of counting and computations based upon premised relationships between the members of the thorium, uranium and actino-uranium series and certain values of the de-emanation of radioactive gases from surface soil or rock, and using comparison of the ratios between corrected concentrations at the different points from which samples were taken for calculating the location of sub-surface deposits.

6. A method of geophysical exploration including, taking samples from the earth at different points in a field being investigated, measuring the radioactivity of the radon and the relative proportions of helium and of hydrogen held by said samples to determine the ratios of the concentrations of said radon, helium and hydrogen between the different points from which samples were taken, and calculating by comparison of said ratios the presence and location of a sought for deposit.

7. A method of geophysical exploration including, taking samples from the earth at different points in a field being investigated, measuring the radioactivity of the radon and the relative proportions of helium and hydrogen and of diffusible organic constituents held by said samples to determine the ratios of the concentrations of said radon, helium, hydrogen and diffusible organic constituents between the different points from which samples were taken, and calculating by comparison of said ratios the presence and location of a sought for deposit.

8. A method of geophysical exploration including, taking samples from the earth at different points in a field being investigated, measuring the radioactivity of the radon and the relative proportions of helium and of hydrogen and of diffusible organic constituents and of inorganic "ion-fragments" held by said samples to determine the ratios of the concentrations of said radon, helium, hydrogen, diffusible organic constituents and inorganic "ion fragments" between the different points from which samples were taken, and calculating by comparison of said ratios the presence and location of a sought for deposit.

9. A method of geophysical exploration including, taking samples from the earth at different points and depths in a field being investigated, measuring the radioactivity of the radon held by said samples to determine the ratios between the concentrations thereof at the different points and depths from which samples were taken, and calculating by comparison of said ratios the presence and horizontal and vertical location of a sought for deposit.

10. A method of geophysical exploration including, taking samples from the earth at different points and depths in a field being investigated, measuring the radioactivity of the emanations held by said samples, separating emanations from said samples due to the normal constituents thereof from emanations generated by a sought for deposit, determining the ratios between the significant concentrations of said emanations at the different points and depths from which samples were taken, and calculating by comparison of said ratios the presence and horizontal and vertical location of a sought for deposit.

11. A method of geophysical exploration including, taking samples from the earth at different points and depths in a field being investigated, measuring the radioactivity of the radon and the relative proportions of helium held by said samples to determine the ratios between the concentrations thereof at the different points and depths from which samples were taken, and calculating by comparison of said ratios the presence and horizontal and vertical location of a sought for deposit.

12. A method of geophysical exploration including, taking samples from the earth at different points and depths in a field being investigated, measuring the relative proportions of helium present in the samples, correcting for helium formed by surface materials by making an additional measurement on the samples, determining the ratios between said corrected helium proportions at the different points and depths from which samples were taken with the aid of premised values of the period in which the helium accumulated and of the diffusion factor, and calculating by comparison of said ratios the presence and location of sub-surface deposits.

13. A method of geophysical exploration including, taking samples from the earth at different points and depths in a field being investigated, measuring the radioactivity of the radon and the relative proportions of helium and of hydrogen held by said samples to determine the ratios of the concentrations of said radon, helium and hydrogen between the different points and depths by comparison of which samples were taken, and calculating from said ratios the presence and horizontal and vertical location of a sought for deposit.

14. A method of geophysical exploration including, taking samples from the earth at different points and depths in a field being investigated, measuring the radioactivity of the radon and the relative proportions of helium and of hydrogen and of diffusible organic constituents held by said samples to determine the ratios of the concentrations of said radon, helium, hydrogen and diffusible inorganic constituents between the different points and depths from which samples were taken, and calculating by comparison of said ratios the presence and horizontal and vertical location of a sought for deposit.

15. A method of geophysical exploration including, taking samples from the earth at different points and depths in a field being investigated, measuring the radioactivity of the radon and the relative proportions of helium and of hydrogen and of diffusible organic constituents and of inorganic "ion-fragments" held by said samples to determine the ratios of the concentrations of said radon, helium, hydrogen, diffusible organic constituents and inorganic "ion fragments" between the different points and depths from which samples were taken, and calculating by comparison of said ratios the presence and horizontal and vertical location of a sought for deposit.

16. A method of geophysical exploration including, taking samples from the earth at different points in a field being investigated, separating emanations from said samples due to the normal constituents thereof from emanations generated by a sought for deposit by making corrections based upon separate measurements of said emanations, and calculating from said emanations generated by a sought for deposit the presence and location of a sought for deposit.

17. A method of geophysical exploration including, taking samples from the earth at different points in a field being investigated, separating emanations from said samples due to the normal constituents thereof from emanations generated by a sought for deposit by making corrections based upon a measurement of the rate of radioactive ray emission from the solid sample as well as from the emanations, using the corrected emanation counts to determine the concentrations at the different points from which samples were taken, and calculating from said concentrations the presence and location of a sought for deposit.

18. A method of geophysical exploration including, taking samples from the earth at different points in a field being investigated, separating emanations from said samples due to the normal constituents thereof from emanations generated by a sought for deposit by making corrections based upon a measurement of the rate of radio-active ray emission from the solid sample as well as from the emanations, using the corrected emanation counts to determine the ratios between the concentrations at the different points from which samples were taken, and calculating by comparison of said ratios the presence and location of a sought for deposit.

19. A method of geophysical exploration including, taking samples from the earth at different points in a field being investigated, separating emanations from said samples due to the normal constituents thereof from emanations generated by a sought for deposit by making corrections based upon a measurement of the rate of alpha ray emission from the solid sample as well as from the emanations, using the corrected emanation counts to determine the ratios between the concentrations at the different points from which samples were taken, and calculating by comparison of said ratios the presence and location of a sought for deposit.

20. A method of geophysical exploration including, taking samples from the earth at different points in a field being investigated, separating emanations from said samples due to the normal constituents thereof from emanations generated by a sought for deposit by making corrections based upon a measurement of the rate of gamma ray emission from the solid sample as well as from the emanations, using the corrected emanation counts to determine the ratios between the concentrations at the different points from which samples were taken, and calculating by comparison of said ratios the presence and location of a sought for deposit.

21. A method of geophysical exploration including, taking samples from the earth at different points in a field being investigated, separating emanations from said samples due to the normal constituents thereof from emanations generated by a sought for deposit by making corrections based upon a measurement of the rate of alpha, beta and gamma ray emission from the solid sample as well as from the emanations, using the corrected emanation counts to determine the ratios between the concentrations at the different points from which samples were taken, and calculating by comparison of said ratios the presence and location of a sought for deposit.

22. A method of geophysical exploration including, taking samples from the earth at different points in a field being investigated, measuring the total radioactivity of said samples, estimating the radioactivity of constituents of said samples generated by a sought for deposit, determining the ratios between the radioactivities of the significant constituents at the different points from which samples were taken, and calculating by comparison of said ratios the presence and location of a sought for deposit.

23. A method of geophysical exploration including, taking samples from the earth at different points and depths in a field being investigated, measuring the total radioactivity of said samples, estimating the radioactivity of constituents of said samples generated by a sought for deposit, determining the ratios between the radioactivities of the significant constituents at the different points and depths from which samples were taken, and calculating by comparison of said ratios the presence and horizontal and vertical location of a sought for deposit.

HANS T. F. LUNDBERG.
NORMAN B. KEEVIL.

CERTIFICATE OF CORRECTION.

Patent No. 2,330,829. October 5, 1943.

HANS T. F. LUNDBERG, ET AL.

It is hereby certified that error appears in the printed specification of the above numbered patent requiring correction as follows: Page 7, second column, line 72, claim 7, before the word "hydrogen" insert --of--; page 8, first column, line 73, claim 13, for "retios" read --ratios--; line 75, same claim, strike out "depths by comparison of which samples were" and insert instead --depths from which samples were taken, and calculating by comparison of--; and second column, line 1, same claim 13, strike out "taken, and calculating from"; and that the said Letters Patent should be read with this correction therein that the same may conform to the record of the case in the Patent Office.

Signed and sealed this 23rd day of November, A. D. 1943.

(Seal)

Henry Van Arsdale,
Acting Commissioner of Patents.